(12) United States Patent
Gerhardt et al.

(10) Patent No.: US 12,351,000 B2
(45) Date of Patent: Jul. 8, 2025

(54) METHOD AND SYSTEMS OF CONTROLLING CABIN VENTILATION OF A VEHICLE

(71) Applicant: Ford Global Technologies, LLC, Dearborn, MI (US)

(72) Inventors: Torsten Gerhardt, London (GB); Brian Pearce, Maldon (GB); Adriana Cevoli Giroldo, Brentwood (GB); Mark Michel, Dartford (GB); Yichen Gao, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 592 days.

(21) Appl. No.: 17/706,459

(22) Filed: Mar. 28, 2022

(65) Prior Publication Data

US 2023/0302874 A1     Sep. 28, 2023

(51) Int. Cl.
*B60H 1/24* (2006.01)
*B60H 1/00* (2006.01)
*B60H 1/26* (2006.01)

(52) U.S. Cl.
CPC ..... *B60H 1/00821* (2013.01); *B60H 1/00778* (2013.01); *B60H 1/26* (2013.01)

(58) Field of Classification Search
None
See application file for complete search history.

(56) References Cited

U.S. PATENT DOCUMENTS

| | | | |
|---|---|---|---|
| 9,337,516 B2 * | 5/2016 | Klausner | H01M 50/209 |
| 9,616,731 B2 | 4/2017 | Koberstein et al. | |
| 10,696,133 B2 * | 6/2020 | Dawson | B60H 1/248 |
| 2011/0059341 A1 * | 3/2011 | Matsumoto | H01M 10/052 |
| | | | 429/82 |

FOREIGN PATENT DOCUMENTS

| | | |
|---|---|---|
| DE | 102013224745 A1 | 6/2015 |
| DE | 102020104280 A1 | 8/2021 |
| JP | 2010070011 A | 4/2010 |

* cited by examiner

*Primary Examiner* — Ko-Wei Lin
(74) *Attorney, Agent, or Firm* — Haley Guiliano LLP (57) ABSTRACT

Systems and methods of controlling the ventilation of an electric vehicle comprising a power cell and a cabin vent. An operational mode of the electric vehicle is determined. An operational state of the power cell is determined. The closure of the cabin vent is controlled based on the operational mode of the electric vehicle and the operational state of the power cell.

15 Claims, 6 Drawing Sheets

METHOD AND SYSTEMS OF CONTROLLING CABIN VENTILATION OF A VEHICLE

BACKGROUND

The present disclosure relates to methods and systems of controlling cabin ventilation of a vehicle. More particularly, but not exhaustively, the present disclosure relates to controlling the closure of the vent based on the operational mode of the vehicle and the operational state of the battery.

SUMMARY

The automotive industry is transitioning away from combustion engines and towards electric vehicles (EVs), e.g., in order to reduce greenhouse emissions. Electric vehicles can be broadly split into two categories: battery electric vehicles (BEVs), where the electric motors are powered by batteries, and fuel cell vehicles (FCVs), where the electric motors are supplied with electricity from fuel cells. This transition towards EVs places different design constraints and considerations upon vehicles compared to combustion engine vehicles that must be addressed in order to encourage their proliferation.

As an example, campers (which are also known as camper vehicles, campervans, camper vans, motor caravans, motor homes or caravanettes) are specialty vehicles that must meet both the requirements of transport and accommodation. As discussed above, to fulfil the greener transport requirements, future camper vehicles could be EVs. Camper vehicles also have the additional requirement of needing to provide accommodation that may include sleeping, cooking, eating, socializing and the like.

One requirement for camper EVs is ensuring that the accommodation of the camper is sufficiently isolated from a power cell, e.g., a battery or a fuel cell, of the EV. That is, the cabin may be designed to limit ingress of any fire, flames, heat, gases, particles, or smoke.

Due to their size and weight, it is common for batteries and components of fuel cell systems of EVs to be located underneath the floor of the cabin of EVs. It is also common for the batteries and fuel cell components to extend along the entirety or at least the majority of the underneath of the cabin. This is particularly true for the traction batteries of BEV which are typically situated along the majority of the undercarriage of the BEV and, in particular, the majority of the undercarriage between the main front and rear axles. Accordingly, one of the present design restraints of current EVs is to provide a solid floor without any apertures or ingress points to limit and inhibit the ingress of fire, flames, heat, gases, particles, or smoke through the floor.

However, in campers, and some other vehicles, e.g., commercial vehicles, it is often necessary to ventilate the cabin to prevent the build-up of undesirable, or potentially dangerous, gases. These gases include carbon dioxide, other gases, and moisture produced by the occupants, and gases produced or leaked from cooking, refrigeration, and electrical equipment. These gases can build up within the cabin simply from the cabin being used as intended, e.g., as accommodation for sleeping and cooking, or larger vehicles such as buses and coaches being full. Often in combustion vehicles, an aperture or egress point is often provided in the floor of the cabin to allow gases to egress from the cabin, thereby ventilating the cabin and preventing the build-up of undesirable gases. It has been found beneficial to provide for the aperture or egress point to be provide in the floor of the cabin as often the undesirable, or potentially dangerous, gases are typically heavier than air, e.g. carbon dioxide. Thus, providing a ventilation aperture or egress point in the floor enables the gases to vent passively (i.e. without the need of a fan or other powered device).

However, for some EVs, such as campers, this creates conflicting and incompatible requirements. On one hand the cabin should be isolated from the underneath of the vehicle to prevent and/or inhibit the ingress of gases from the underneath the vehicle. On the other hand, it is beneficial for the cabin to be able to vent and egress gases towards the underneath of the vehicle.

Objects and aspects of the present invention aim to alleviate and solve these problems with the prior art. Methods and systems are provided herein for controlling cabin ventilation of a vehicle by, for example, controlling the closure of a vent based on an operational mode of the vehicle and an operational state of a power cell of the vehicle.

Systems and methods are provided herein to control the closure of a cabin vent that ventilates the cabin of an EV by controlling the closure of the cabin vent based on an operational mode of the EV and an operational state of a battery and/or a fuel cell.

According to some aspects of the present invention, a method of controlling the ventilation of an electric vehicle comprising a power cell and a cabin vent, e.g., located within the floor of the electric vehicle, is provided. An operational mode of the vehicle is determined by, for example, an electronic control unit or position on a switch. An operational state of the power cell is determined by, for example, a power management system, an electronic control unit, a heat sensor, and/or a pyrotechnic latch. The method further comprises controlling the closure of the cabin vent based on the operational mode of the vehicle and the operational state of the power cell. In this way, the closure of the cabin vent can be controlled to fulfil both the requirements discussed above. Namely, the cabin vent can be controlled to prevent, limit or inhibit the ingress of gases into the cabin by closing the cabin vent, and the cabin vent can be controlled to allow, enable, or encourage ventilation of the cabin and egress of gases from the cabin by opening the cabin vent. That is, by controlling the cabin vent, the apparently contradictory requirements of ventilating the cabin against the build-up of gases and protecting occupants of the cabin from ingress of smoke, gases, etc., can be simultaneously achieved.

In some examples, the cabin vent comprises an aperture that can be closed by the movement of a member, such as a flap, to occlude the aperture. In the context of the disclosure, closing or occluding the cabin vent will be understood to mean that the flow of gases, or heat through the cabin vent is substantially impeded, inhibited, or prevented.

In some examples, in response to determining that the operational mode of the vehicle is in drive and/or charge mode, the cabin vent is closed. As such, it may be beneficial to keep the cabin vent closed during such instances as a precaution. Drive and/or charge mode may be manually determined by the user of the electric vehicle and/or the modes may be automatically determined by one or more sensors and electronic control units of the electric vehicle. In some examples, a switch may be toggleable by both the manual and automatic means described herein. In some examples, the automatic toggling of the switch is designed as a back-up option in case the user forgets to switch or incorrectly switches the mode.

In some examples, in response to determining that the operational mode of the vehicle is in park and/or camp mode, the cabin vent is opened. When the electric vehicle is in park or camp mode, it is anticipated that there is a greater likelihood of undesirable gases building-up to undesirable concentrations within the cabin. As such, it is beneficial for the cabin vent to be open as the norm to ventilate the cabin as a precaution. Park and camp mode may be manually determined by the user of the electric vehicle and/or the modes may be automatically determined by one or more sensors and electronic control units of the electric vehicle.

In some examples, in response to determining that the operational mode of the vehicle is normal, the cabin vent is opened. That is, the cabin vent is normally open whilst the operational mode of the vehicle is normal and no faults are detected by, for example, an ECU.

In some examples, in response to determining that the operational state of the power cell indicates that an error state has occurred, the cabin vent is closed. In these examples, the electric vehicle comprises a means for determining that a power cell error state, e.g., a failure event, has occurred. The failure event may be related to a partial failure of one or more systems or components of the power cell, and/or one or more control systems for operating the power cell. Additionally or alternatively, the failure event may be related to one or more operational parameters of a vehicle to which the power cell is fitted.

The determination may be performed by a power cell management system and/or electronic control unit that monitors the power cell. Alternatively, the determination that an error state has occurred may be detected by the outcomes of a failure event, such as the detection of gases, flames, or heat. For example, sensors or components that are sensitive to and can detect the gases, flames or heat may be provided that provide a signal to or directly control the closure of the cabin vent. In this way, the cabin vent is normally open, and closed during a failure event. This helps to improve the ventilation of the cabin during normal use and mitigate ingress of smoke and/or gas into the cabin.

In some examples, in response to determining that the operational state of the battery cell indicates that the battery cell is being charged, the cabin vent is closed. When the electric vehicle is being charged, there may be a greater likelihood a failure event occurring. As such, it may be beneficial to keep the cabin vent closed during such instances. Whether or not the battery is being charged may be manually determined by the user of the electric vehicle and/or the modes may be automatically determined by one or more sensors and electronic control units of the electric vehicle. For example, the charging port cover being open, may be used to determine that the battery is being charged or likely to be charged in the near future.

In some examples, the operational state of the power cell is determined by detecting the presence of fire, heat, or flames proximate the power cell and/or cabin vent. Detecting the presence of fire, heat, or flames proximate the power cell and/or cabin vent represents an indirect method of detecting the operational state of the power cell. The presence of these indirect indicators may cause the cabin vent to be closed. In this way, the cabin vent is normally open, and closed during a failure event. This helps to improve the ventilation of the cabin during normal use.

In some examples, the operational state of the power cell is determined by a heat-deformable latch. In the context of the present disclosure, a latch will be understood to be any member, clasp, hook, rod, or the like that can hold a second member in place and is not limited to a specific size, shape or design. In the context of the present disclosure, the heat-deformable latch will be understood to be a latch that deforms under the temperatures, heat, or flames. Examples of heat-deformable latch include pyrotechnic latches that deform through chemical reactions upon the application of heat or flames; polymeric latches than plastically deform upon the application of heat or flames; or latches comprising a flammable portion; and magnetically secured latches where the magnets lose their magnetism upon the application of heat or flames, magnetically secured latches may include permanent magnets that undergo magnetic scrambling and electromagnets whose power is disrupted. In these examples, the heat-deformable latch ensures that the cabin vent in normally open, and closed during a failure event.

In some examples, the operational state of the power cell is determined by an electronic control unit and/or a battery management system. The electronic control unit or battery management system can then relay this information to, for example, an actuator to release the member and close the cabin vent.

In some examples, the closure of the cabin vent is controlled by a pyrotechnic latch releasing a biased member, that is biased towards occluding the cabin vent, from a position where the biased member does not occlude the cabin vent. In this way, the cabin vent is normally open improving cabin ventilation but the member is biased towards the closed position, ensuring that the cabin vent is occluded during a failure event.

In some examples, the closure of the cabin vent is controlled by an electronic control unit or battery management system providing instructions to an actuator to release a biased member, that is biased towards occluding the cabin vent, from a position where the biased member does not occlude the cabin vent. In this way, the cabin vent is normally open improving cabin ventilation and the member is only actuated when a event is detected by the battery management system.

In some examples, the closure of the cabin vent is controlled by a switch that is toggleable between at least two different modes, where the switch is configured to send instructions to an actuator to open the vent when the switch is set to park and/or camp mode and close the vent when the switch is set to drive and/or charge mode. The switch is typically toggled manually by the user but, in some examples, may also be toggled automatically by sensors and electronic control units of the electric vehicle. When the electric vehicle is in park and/or camp mode, it is anticipated that there is a greater likelihood of undesirable gases building-up to undesirable concentrations within the cabin, e.g., by virtue of the vehicle being used/occupied. When the electric vehicle is being driven or charged, a failure event may occur, e.g., during an unexpected collision. As such, the switch of this examples ensures that the closure of the cabin vent is controlled in an optimal manner.

In some examples, the method further comprises checking the closure of the cabin vent after the closure of the cabin vent has been controlled based on the operational mode of the vehicle and the operational state of the power cell. In this way, the way the method can affirm that the cabin vent has been open or closed as intended by the method. This can then be alerted to a user of the vehicle or certain systems can be disabled.

According to some aspects of the present invention, a system of controlling the ventilation of an electric vehicle comprising a power cell and a cabin vent is provided. The system comprising: a member configured to selectively close the cabin vent based on an operational mode of the electric vehicle and an operational state of the power cell.

In some examples, the system comprises: a member biased towards a closed position for occluding the cabin vent in the electric vehicle; a heat-deformable latch arranged to hold the biased member in an open position, wherein the heat-deformable latch is arranged to be deformed and release the biased member by the heat or flames, thereby allowing the biased member to move towards the closed position. In this way, the heat-deformable latch, as described above, can deform, disengage from the biased member, thereby closing the cabin vent during a failure event. In this example, the cabin vent is normally open which improves cabin ventilation. In some examples, the heat-deformable latch is a pyrotechnic latch.

In some examples, the system comprises a member biased towards a closed position for occluding the cabin vent in the electric vehicle; a latch arranged to hold the biased member in an open position; and an actuator arranged to move the latch from an engaged position, where the latch holds the biased member in the open position, to an disengaged position, where the latch does not engage the biased member; wherein the actuator is arranged to move the latch the engaged position to the disengaged position, thereby allowing the biased member to move towards the closed position, on receiving a signal from a battery management system or electronic control unit. In this example, the latch is only actuated, and the cabin vent closed, upon a signal. Thus, the cabin vent is normally open which improves cabin ventilation. The latch is typically actuated on a signal from a battery management system or an electronic control unit, as these units are typically the units used to receive and transmit signals or data that signifies that a battery failure event has occurred. In other examples, any source of identifying a failure event may be used to provide a signal to the actuator.

In some examples, the system comprises a member arranged to be moved between an open position and a closed position for occluding the cabin vent in the electric vehicle; an actuator arranged to move the member between its open position and its closed position; a sensor arranged to detect the position of the member; and a switch arranged to provide instructions to the actuator to move the member between the its open and closed position based on the operational mode of the vehicle and the operational state of the battery. In this way, a user may manually control, via the switch, the position of the member and, therefore, the closure of the cabin vent. Alternatively, the switch may be automatically toggleable by electronic control systems of the vehicles as has been described elsewhere.

According to some aspects of the present invention, a system of controlling the ventilation of an electric vehicle comprising a power cell and a cabin vent is provided. The system comprising: a member configured to close the cabin vent based on an operational state of the power cell and/or an environment, e.g., temperature, surrounding the power cell.

In some examples, the system comprises: a member biased towards a closed position for occluding the cabin vent in the electric vehicle; a heat-deformable latch arranged to hold the biased member in an open position, wherein the heat-deformable latch is arranged to be deformed and release the biased member by the heat or flames, thereby allowing the biased member to move towards the closed position. In this way, the heat-deformable latch, as described above, can deform, disengage from the biased member, thereby closing the cabin vent during a failure event, e.g., when the environment, e.g., temperature, surrounding the power cell breaches a threshold value or level. In this example, the cabin vent is normally open which improves cabin ventilation. In some examples, the heat-deformable latch is a pyrotechnic latch. In some examples, the latch is also arranged to bias the member in the open position.

According to some aspects of the present invention, an electric vehicle is provided. The electric vehicle comprising one or more of the systems described above. In some examples, the electric vehicle comprises a cabin with a floor, a power cell located within or associated with the floor, a cabin vent extending through the floor. The systems according to the invention are configured to control the closure of the cabin vent of the electric vehicle of this aspect.

According to some aspects of the present invention, there is provided a non-transitory computer-readable medium having non-transitory computer-readable instructions encoded thereon for performing the methods described herein.

According to some aspects of the present invention, an electronic control unit is provided. The electronic control unit comprising: a means for determining the operational mode of an electric vehicle; a means for determining the operational state of a power cell of the electric vehicle; and a means for controlling the closure of a cabin vent, e.g., located within a floor of a cabin of the electric vehicle, based on the operational mode of the electric vehicle and the operational state of the power cell.

According to some aspects of the present invention, there is provided. An electric vehicle comprising the electronic control unit of the previous aspect.

FIGURES

The above and other objects and advantages of the disclosure will be apparent upon consideration of the following detailed description, taken in conjunction with the accompanying drawings, in which.

The figures herein depict various examples of the disclosed disclosure for purposes of illustration only. It shall be appreciated that additional or alternative structures, systems and methods may be implemented within the principles set out by the present disclosure.

DETAILED DESCRIPTION

Figure 1:
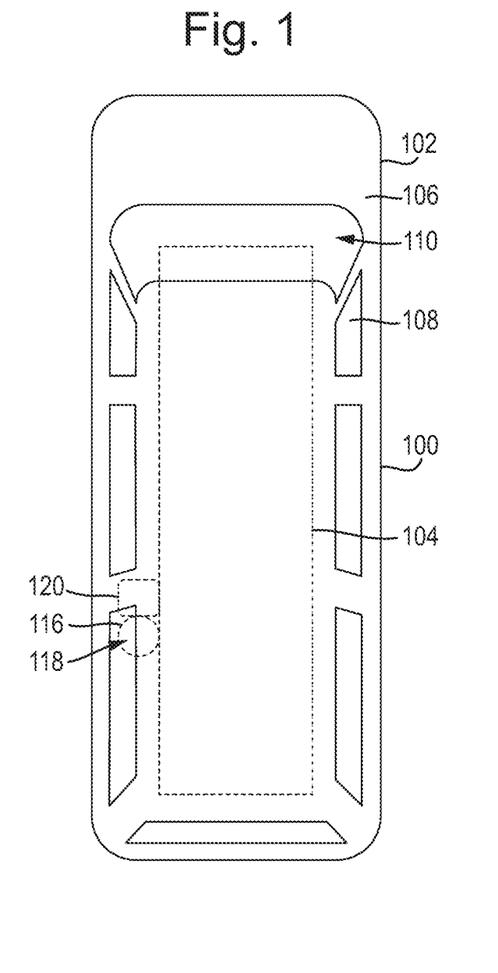
FIG. 1 illustrates a schematic top-down view of the top a battery electric vehicle (BEV) comprising a cabin vent, in accordance with some examples of the disclosure.
Figure 2:
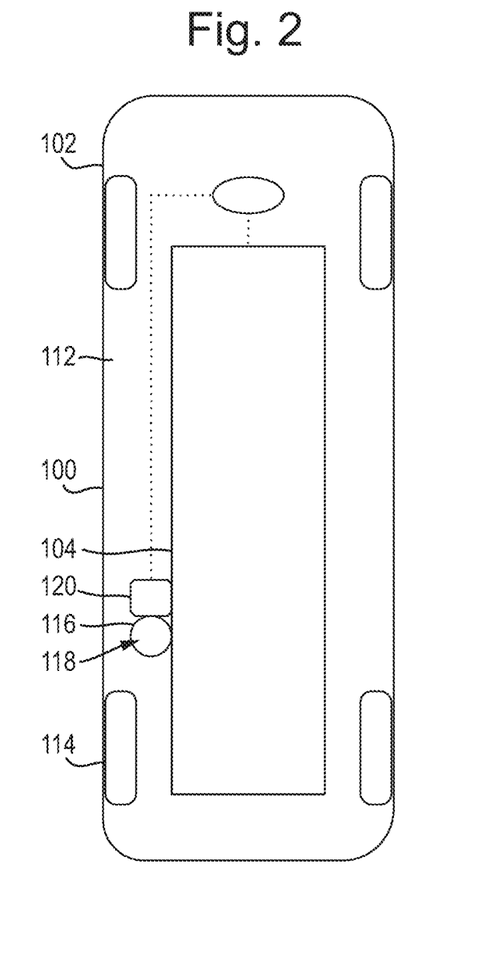
FIG. 2 illustrates a schematic bottom-up view of the undercarriage of the BEV of FIG. 1 comprising a cabin vent, in accordance with some examples of the disclosure.

FIG. 1 shows a top-down view of a battery electric vehicle (BEV) 100 in accordance with some examples of the disclosure. FIG. 2 shows a bottom-up view of the BEV 100 of FIG. 1. In this example, the BEV 100 is a camper 102 that comprises a traction battery 104 for providing electric power to the electric motors of the BEV 100. However, the present disclosure is not limited to campers and battery electric vehicles may be applicable to all electric vehicles, such as other electric vehicles, e.g., mild-hybrid electric vehicles, plugin hybrid electric vehicles, and fuel cell vehicles.

The camper 102 comprises a body 106, doors and windows 10 which encloses the cabin 110, or interior, of the camper 102. Located at the base or bottom of the cabin 110 is the floor 112 of the cabin 110 and camper 102. In the context of the present disclosure, the floor 112 of the BEV 100 and camper 102 will be understood to comprise any part of the body 106 or undercarriage of the BEV 100 located between the bottom surface of the cabin 110 and external environment underneath the BEV 100. The traction battery 104 supplies power to one or more electric motors (not shown) to power the wheels 114 and transport the vehicle. The traction battery 104 is located underneath the cabin 110 and may form part of the floor 112 or undercarriage of the BEV 100, and the traction battery 104 is consider as part of the floor 112.

The BEV 100 further comprises a cabin vent 116 located in the floor 112 of the cabin 110. In this example, the cabin vent 116 is adjacent to the traction battery 104. In FIG. 1, the cabin vent 116 and the traction battery 104 are depicted in dashed lines to show their relative position, but they are not visible from this top-down view. In one or more other examples, the cabin vent 116 may located in any appropriate position on the vehicle, e.g., in a side panel, door, tailgate, etc., where technically appropriate to implemented the disclosure contained herein.

In other examples in accordance with the invention, the relative positions of the cabin vent 116 and the traction battery 104, or fuel cell, in the floor 112 may vary. For example, the cabin vent 116 and the traction battery 104 may be disposed proximate or in a spaced relation to one another on the undercarriage on the BEV 100. Alternatively, the cabin vent 116 may surrounded by traction battery 104 on multiple sides and in some examples the cabin vent 116 may be considered to extend through the traction battery 104 as it will be surround on all sides by the traction battery 104.

The cabin vent 116 comprises an aperture 118 that extends from the cabin 110 of the camper 102 through the floor 112 to the exterior of the BEV 100 and the external environment. The cabin vent further comprises or is associated with an actuation mechanism 120. The actuation mechanism 120 is arranged to actuate between a closed position, where the cabin vent 116 is occluded, and an open position, where the cabin vent 116 is open. Examples of actuation mechanisms 120 are discussed in more detail below in reference to FIGS. 3A-5B.

When the actuation mechanism 120 is in its closed position, fire, flames, heat, gases, particles or smoke, e.g., during a failure event caused by a collision or otherwise, or elsewhere on the undercarriage of the BEV 100, are prevented, or at least inhibited, from entering into the cabin 110 via the cabin vent 116 as the cabin vent 116 is occluded. Additionally, when the actuation mechanism 120 is in its closed position gases from the cabin 110 are prevented, or at least inhibited, from venting or exiting the cabin 110 towards the exterior of the BEV 100 via the cabin vent 116 as the cabin vent is occluded. When the actuation mechanism 120 is in its open position gases within the cabin 110 may vent or exit the cabin towards the exterior of the BEV 100 via the cabin vent 116 as the cabin vent 116 is open and unobstructed. As such, when the actuation mechanism 120 is in its open position, the cabin 110 may be considered to be ventilated.

The vehicle further comprises an electronic control unit (ECU) 122 that is communicatively connected with traction battery 104 and the actuation mechanism 120. The ECU 122 is arranged to determine the state or position of the actuation mechanism 120, to determine the state of the traction battery 104, and to determine the operational state of the BEV 100. The state of the traction battery may include, but is not limited to, drive mode, charge modes, and failure detected. The operational state of the vehicle may include, but is not limited to, drive, charge, park and camp modes, oa one or more security states of the vehicle. In some further examples, the ECU 122 is arranged to control the position and/or function of the actuation mechanism 120. In some further examples, the ECU 122 is arranged to control the on/off state or function of the traction battery 104. The ECU 122 is discussed in more depth in relation to FIG. 6.

FIGS. 3A-5B show different examples of actuation mechanisms 120 that are each in accordance with the present invention. In each of FIGS. 3A-5B a traction battery 104 of a BEV 100 are positioned proximate to the cabin vent 116 and its aperture 118. However, for the clarity of the drawings, the traction battery 104 has been omitted. In the context of the disclosure, the proximate relationship between the traction battery 104 and the cabin vent 116 will be understood to mean that they are positioned close enough to each other on the floor 112 of the BEV 100 such that during a failure event gases, fire, flames or the like may enter the cabin vent 116, e.g., depending on one or more external factors. In other examples, the fuel cell components of a FCV may be positioned proximate the cabin vent 116.

Figure 3A:
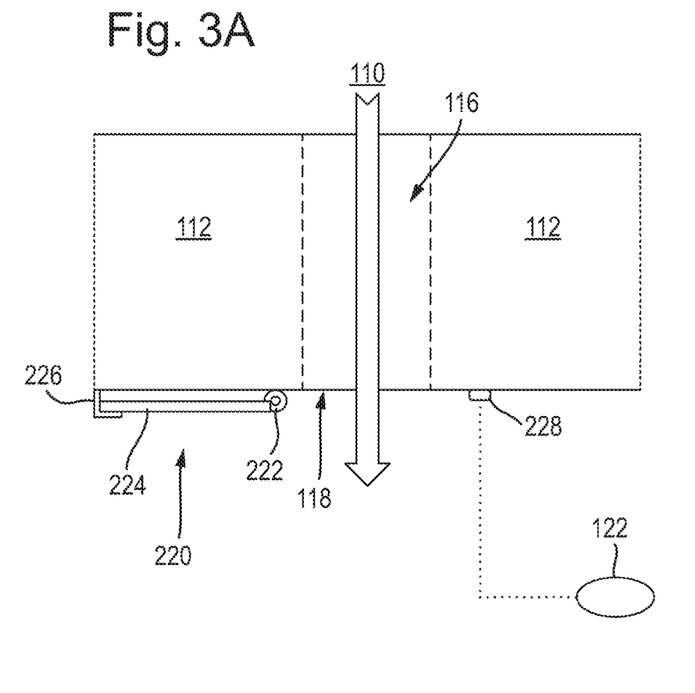
FIG. 3A illustrates a schematic side-on cutaway view of a first actuation mechanism in its open position relative to a cabin vent, in accordance with some examples of the disclosure.
Figure 3B:
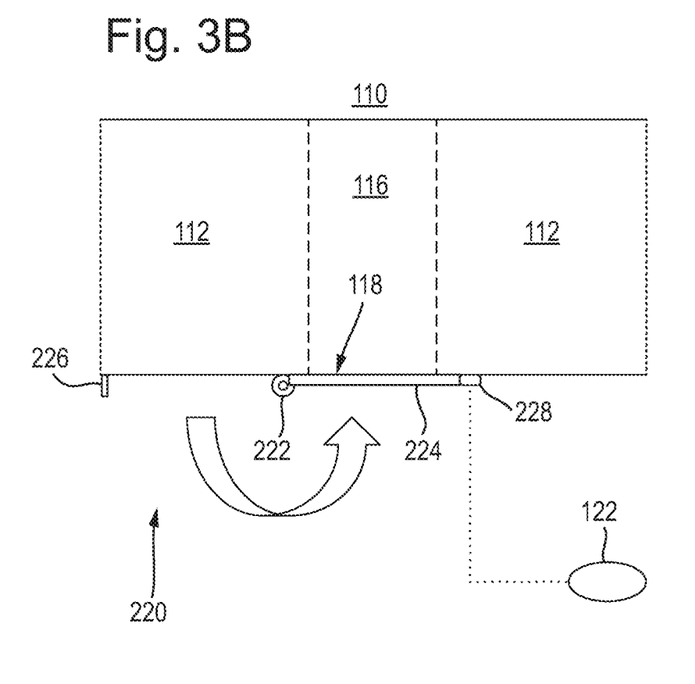
FIG. 3B illustrates a schematic side-on cutaway view of the first actuation mechanism of FIG. 3A in its closed position relative to a cabin vent, in accordance with some examples of the disclosure.

FIGS. 3A-3B show a first example of an actuation mechanism 220 that can be used in the BEV 100 of FIG. 1. FIG. 3A shows the first example of the actuation mechanism 220 in its open position, and FIG. 3B shows the first example of the actuation mechanism 220 in its closed position. When the actuation mechanism 220 is in its open position, gases from the cabin 110 can vent or exit the cabin 110 via the aperture 118 in the cabin vent 116 in the direction depicted by the block arrow. In this example, the actuation mechanism 220 comprises a spring loaded hinge 222 that is biased towards and arranged to rotate a member 224 to occlude the cabin vent 116 and aperture 118 when it is in its closed position (see FIG. 3B). In this example, the member 224 may be characterized as a flap and is typically shaped to be complementary in shape to the aperture 118 and larger in size. The member 224 is held in its open position by a latch 226 of the actuation mechanism 220, thereby allowing gases to egress from the cabin 110 (direction of block arrow in FIG. 3A). As such, the first example of the actuation mechanism 220 may be classified as a normally open actuation mechanism 220, as the cabin vent 116 will remain open until the appropriate stimulus (as discussed later for this example) moves the actuation mechanism 220 into its closed position and closes the cabin vent 116.

In this example, the latch 226 is a pyrotechnic latch that undergoes a chemical reaction such that upon the application of more heat than normal, which may occur, for example, during a fire. In such an event, the latch 226 is deformed such that it releases the member 224 (see FIG. 3B). Since, the member 224 is biased towards its closed position by the spring loaded hinge 222 and no longer held in position by the latch 226, the member 224 rotates from its open position to its closed position, thereby occluding the cabin vent 116 and its aperture 118. Accordingly, the state of the traction battery 104 is determined by the latch 226 as it detects excessive heating, e.g., as a result of a collision or other failure events. The closed position of the actuation mechanism 220, i.e. when the member 224 is occluding the aperture 118, is depicted in FIG. 3B and its curved block arrow shows the direction of rotation of the member 224 from the open to the closed position.

In this example, the shape of the latch 226 is deformed by the chemical (pyrotechnic) reaction, thereby releasing the member 224. However, it is envisaged that the latch 226 could release the biased member 224 by other means. For example, the latch 226 may hold the member 224 by a magnetic force and the pyrotechnic reaction could act to sever the connection of a magnet to the floor 112, thereby releasing the member 224. In another example, the latch 226 can be a polymeric material that undergoes plastic deformation at temperatures associated with a failure event. The polymeric latch 226 would undergo plastic deformation under the force of the spring loaded hinge 222 biasing the member 224. Furthermore, the latch 226 itself could comprise a flammable portion that combusts and thereby releases the biased member 224.

The actuation mechanism 220 further comprises a sensor 228. In this example, the sensor 228 is arranged to detect that the member 224 is in its closed position and is positioned adjacent to the aperture 118 and cabin vent 116. The sensor 228 is communicatively connected to the ECU 122. Thus, the sensor 228 can relay the position (i.e., open or closed) of the actuation mechanism 220 and its member 224, which gives an indication of whether the cabin vent 116 is open or closed and, in this example, the state of the traction battery 104. The ECU 122 can then communicate with the other electronic systems on the BEV 100 to, for example, display a warning light, produce audio signal, provide an alert or notification to the vehicle owner, electrically isolate the battery, turn off the electric motors of the EV, disable the use of certain equipment within the cabin 110 (e.g., cooking equipment).

Figure 4A:
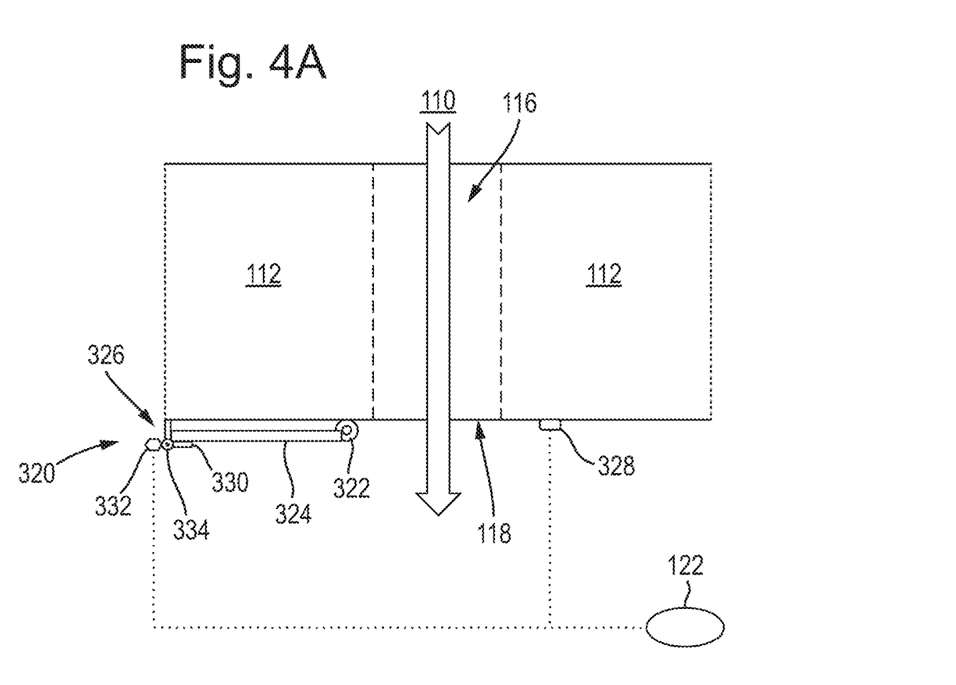
FIG. 4A illustrates a schematic side-on cutaway view of a second actuation mechanism in its open position relative to a cabin vent, in accordance with some examples of the disclosure.
Figure 4B:
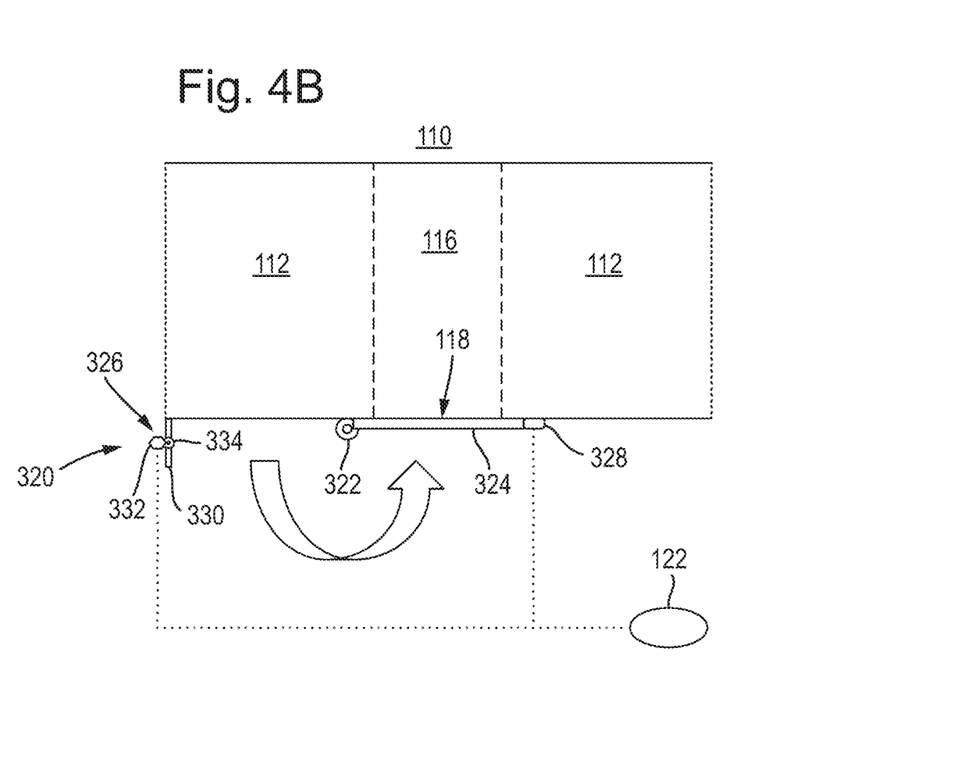
FIG. 4B illustrates a schematic side-on cutaway view of the second actuation mechanism of FIG. 4A in its closed position relative to a cabin vent, in accordance with some examples of the disclosure.

FIGS. 4A-4B show a second example of an actuation mechanism 320 that can be used in the BEV 100 of FIG. 1. FIG. 4A shows the second example of the actuation mechanism 320 in its open position, and FIG. 4B shows the second example of the actuation mechanism 320 in its closed position. When the actuation mechanism 320 is in its open position, gases from the cabin 110 can vent or exit the cabin 110 via the aperture 118 in the cabin vent 116 in the direction depicted by the block arrow. In this example, the actuation mechanism 320 comprises a spring loaded hinge 322 that is biased towards and arranged to rotate a member 324 to occlude the cabin vent 116, thereby closing the actuation mechanism 320 (see FIG. 3B). The member 324 is similar to the member 224 described above. The member 324 is held in its open position by a latch 326 of the actuation mechanism 320, thereby allowing gases to egress from the cabin 110 (direction of block arrow in FIG. 3A). As such, the first example of the actuation mechanism 320 may be classified as a normally open actuation mechanism 320, as the cabin vent 116 will remain open until the appropriate stimulus (as discussed later for this example) closes the cabin vent 116.

In this example, the latch 326 is a comprises a movable portion 330 that is moved by an actuator 332 about a pivot 334. The movable portion 330 of the latch 326 is held in its open position by the actuator 332. In the open position, the movable portion 330 engages the member 324, thereby holding the biased member 324 in its open position.

The actuator 332 is communicatively connected to the ECU 122. The ECU 122 is also communicatively connected to the traction battery 104, such that, in this example, the ECU 122 also acts as a battery management system. In other embodiments, separate battery management systems and ECUs are provided.

In this example, when the ECU 122 detects or is notified that a battery failure event is occurring, or is about to occur, (e.g., from the ECU 122 determining the operational state of the traction battery 104 or receiving a signal regarding its operational state), the ECU 122 instructs the actuator 332 to move, thereby moving the moveable portion 330 of the latch 326 about the pivot 334. This in turn releases the member 324, which is biased towards the closed position by the spring loaded hinge 322, thereby occluding or blocking the cabin vent 116 and its aperture 118.

The actuation mechanism 320 further comprises a sensor 328. In this example, the sensor 228 is arranged to detect that the member 324 is in its closed position and is positioned adjacent to the aperture 118 and cabin vent 106. The sensor 326 is, therefore, positioned to determine whether the actuation mechanism 320 and the member 324 are in their open or closed positions, thereby determining the state of the cabin vent 116.

The sensor 328 is communicatively connected to the ECU 122. Thus, the sensor 328 can relay the position (i.e. open or closed) of the actuation mechanism 320 and its member 324. Accordingly, the ECU 122 can be configured to determine whether or not the cabin vent 118 was been closed successful after it has instructed the actuator 332 to release the latch 326. The ECU 122 can then communicate with the other electronic systems on the BEV 100 to, for example, display a warning light, produce audio signal, provide an alert or notification to the vehicle owner, electrically isolate the battery, turn off the electric motors of the EV, disable the use of certain equipment within the cabin 110 (e.g., cooking equipment).

Figure 5A:
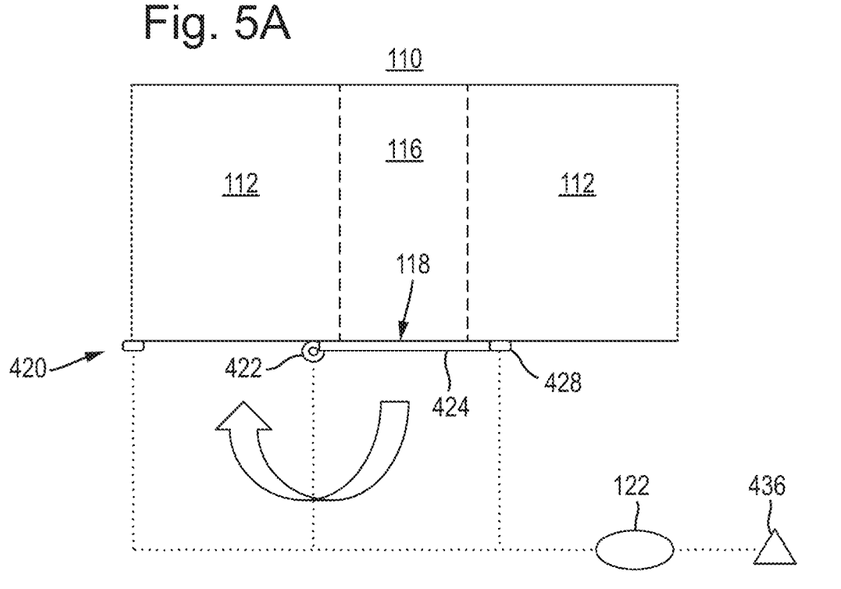
FIG. 5A illustrates a schematic side-on cutaway view of a third actuation mechanism in its closed position relative to a cabin vent, in accordance with some examples of the disclosure.
Figure 5B:
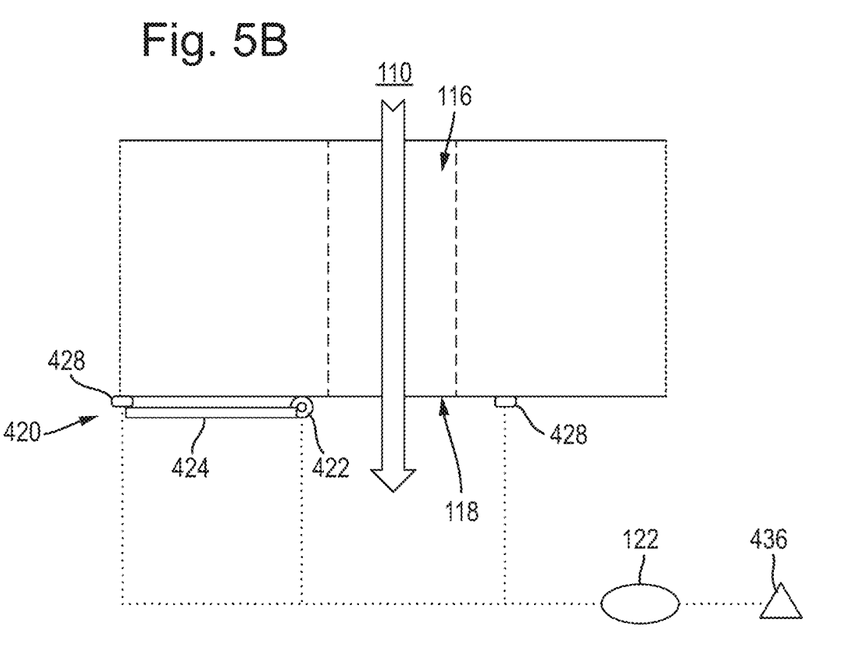
FIG. 5B illustrates a schematic side-on cutaway view of the third actuation mechanism of FIG. 5A in its open position relative to a cabin vent, in accordance with some examples of the disclosure.

FIGS. 5A-5B show a third example of an actuation mechanism 420 that can be used in the BEV 100 of FIG. 1. FIG. 5A shows the third example of the actuation mechanism 420 in its closed position, and FIG. 5B shows the third example of the actuation mechanism 420 in its open position. When the actuation mechanism 420 is in its open position, gases from the cabin 110 can vent or exit the cabin 110 via the aperture 118 in the cabin vent 116 in the direction depicted by the block arrow in FIG. 5B. In this example, the actuation mechanism 420 comprises a motorized member 424 (which can be characterized as a motorized flap) that pivots about an actuator 422. The actuator 422 is communicatively coupled the ECU 122 such that the ECU 122 can control the actuation of the actuator 422 and, therefore, the position of the member 424, thereby opening or closing the cabin vent 116 and its aperture 118. In this example, the ECU 122 is also communicatively coupled to a switch 436. The switch 436 would typically be located within the cabin 110 for operation by the user. In this example, the switch 436 is togglable between "Drive/Charge" and "Camp/Park" mode. The switch 436 communicates which mode is selected by the user of the BEV 100 to the ECU 122. In this example, the switch 436 represents a user-determined operational state of the traction battery 104.

When the "Drive/Charge" mode is selected on the switch 436, the ECU 122 checks the position of the motorized flap using the sensors 428, and if the cabin vent 116 is open, the ECU 122 instructs the actuator 422 to pivot the motorized member 424 into its closed position (FIG. 5A) to prevent the ingress of gases and other pollutants from entering the vehicle. The sensors 428 are positioned to determine whether the actuation mechanism 420 and the motorized member 424 are in their open or closed positions, thereby determining the state of the cabin vent 116.

When "Camp/Park" mode is selected on the switch 436, the ECU 122 checks the position of the motorized flap using the sensors 428, and if the cabin vent 116 is closed, the ECU 122 instructs the actuator 422 to pivot the motorized member 424 into its open position (FIG. 5B) to allow the ventilation of the cabin 110 via the cabin vent 116 and the egress of any undesirable gases in the cabin 110.

In some examples, the switch 436 may also be configured to be automatically toggled between modes by the ECU 122. In these examples, the ECU 122 may communicate with other sensors and electronics within the BEV 100 to detect certain parameters and control the position of the switch 436, and therefore the actuation mechanism 420, based on these parameters. For example, the ECU 122 may receive signals regarding the speed of the vehicle, and when a speed threshold has been surpassed, the switch 436 may be toggled from "Camp/Park" mode to "Drive/Charge" mode. Another example, would be that the ECU 122 is acting as the battery management system of the BEV 100, and when the ECU 122 detects the traction battery 104 is being charged, the switch 426 may be from "Camp/Park" mode to "Drive/Charge" mode. In both these examples, the toggling of the switch 436 would then actuate the actuation mechanism 420 as described above.

Figure 6:
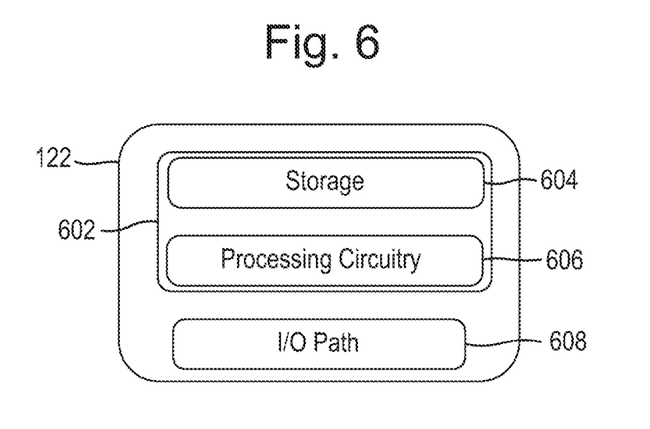
FIG. 6 illustrates a block diagram of an electronic control unit (ECU) of an electric vehicle, in accordance with some examples of the disclosure.

FIG. 6 shows an exemplary block diagram of the ECU 122 as described and depicted above. The ECU 122 includes control circuitry 602, which comprises storage 604 and processing circuitry 606, and I/O path 608. The ECU 122 may be based on any suitable processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, e.g., processing circuitry may be distributed across multiple separate processors, multiple of the same type of processors (e.g., two Intel Core i9 processors), or multiple different processors (e.g., an Intel Core i7 processor and an Intel Core i9 processor).

Storage 604, and/or storages of other components of other vehicle controllers, may be electronic storage devices. As referred to herein, the phrase "electronic storage device" or "storage device" should be understood to mean any device for storing electronic data, computer software, or firmware, such as random-access memory, read-only memory, hard drives, and the like, and/or any combination of the same. In some examples, the ECU 122 executes instructions for an application stored in memory (e.g., storage 604). Specifically, the ECU 122 may be instructed by an application to perform the methods/functions discussed herein.

Additionally or alternatively, the ECU 122 may be configured to transmit and/or receive data via I/O path 608. For instance, I/O path 608 may include a communication port(s) configured to transmit and/or receive data from at least one of the traction battery 104; a battery management system; the sensors, 228, 328, 428; the actuators 332, 422; and any other electronic systems or sensors located on the EV.

Figure 7:
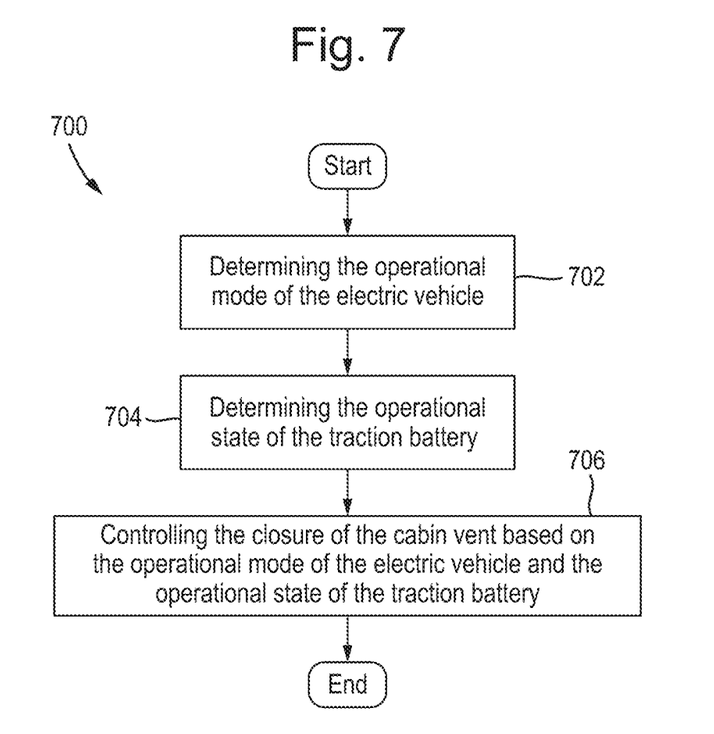
FIG. 7 illustrates a first flowchart for a method for controlling the closure of a cabin vent, in accordance with some examples of the disclosure.

FIG. 7 illustrates a first flow chart for a method for controlling the closure of a cabin vent 116 in accordance with the some examples of the invention. FIG. 7 discloses a general process for controlling the ventilation of an BEV 100 comprising a traction battery 104 and a cabin vent 116 located within the floor 112 of the electric vehicle. That is, FIG. 8 describes a process for controlling the actuation mechanisms 220, 320 and 420 described above. In reference to the method of FIG. 7, actuation mechanism 420 is discussed in detail below, however, the description of the flowchart of FIG. 7 also equally applies to the actuation mechanisms 220 and 320.

In 702, the operational mode of BEV 100 is detected. For example, this is achieved by actuation mechanism 420 by the position of the switch 436 and the mode that is selected.

In 704, the operational state of traction battery 100 is detected. For example, this is achieved by actuation mechanism 420 by the position of the switch 436 and the mode that is selected by the switch 436.

In 706, the closure of the cabin vent 116 is controlled based on the operational mode of the BEV 100 and the operational state of the traction battery 104. For example, in actuation mechanism 420, the position of the switch 436 both determines the operational state of the traction battery 104 and the operation mode of the BEV 100. That is, if the switch 436 is set to drive/charge mode, the operational state of the BEV 100 is determined to be in driving or charging, and the operational state of the battery 104 is determined to be discharging or charging. When the traction battery 104 or BEV 100 is in these modes, the cabin vent 116 should be shut or closed and, as such, the method controls the actuation mechanism 420, as described above, to open the cabin vent 116. Alternatively, if the switch is camp/park mode, the operational state of the vehicle is determined to be in parking or camping, and the operational state of the battery is determined to be neutral. When the traction battery 104 or BEV 100 is in these modes, the cabin vent 116 should be open to ventilate the cabin 110 and, as such, the method controls the actuation mechanism 420, as described above, to open the cabin vent 116.

Figure 8:
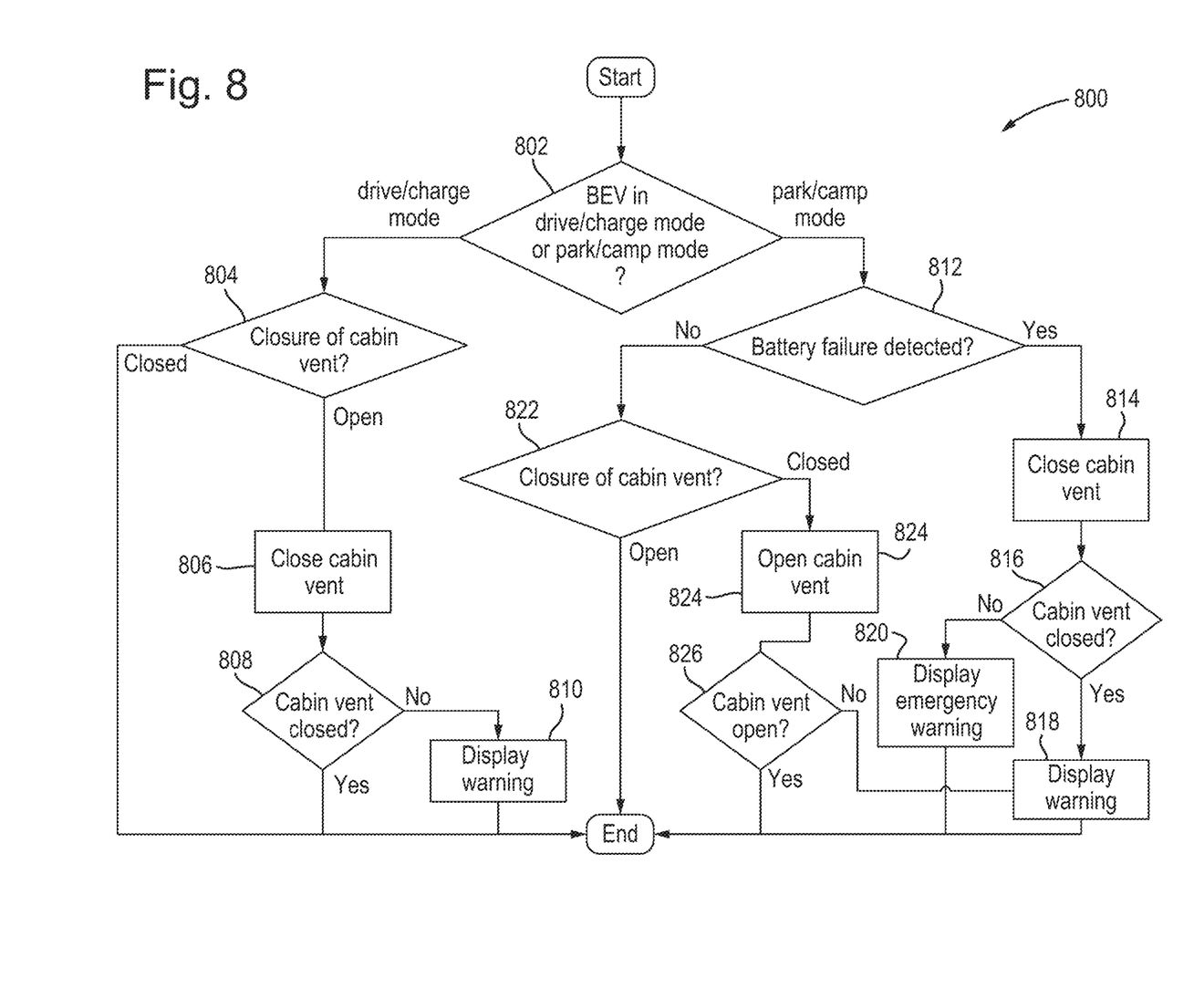
FIG. 8 illustrates a second flowchart for a method for controlling the closure of a cabin vent, in accordance with some examples of the disclosure.

FIG. 8 illustrates a second flow chart for a process 800 for controlling the closure of a cabin vent 116 in accordance with the some examples of the invention. FIG. 8 discloses a general process for controlling the ventilation of an BEV 100 comprising a traction battery 104 and a cabin vent 116 located within the floor 112 of the BEV 100 and, in particular, FIG. 8 describes a process for controlling the actuation mechanism 420.

In 802, the operational state of the vehicle is determined. To do this, it is determined whether the BEV 100 is in drive/charge mode or park/camp mode. In actuation mechanism 420, this is determined by the position of the switch 436. If the switch 436 is set to drive/charge mode, the process proceed to step 804. If the switch 436 is set to park/camp mode, the process proceed to step 812.

In 804, the closure of the cabin vent 116 is determined by the sensors 428. If the cabin vent 116 is closed, as intended for drive/charge mode, then the process ends. If the cabin vent 116 is open, the process proceeds to 806.

In 806, the cabin vent 116 is closed. To achieve this, the ECU 122 sends a signal to the actuator 422 to move the member 424 from its open position (FIG. 5B) to its closed position (FIG. 5A). The process then proceeds to 808.

In step 808, the closure of the cabin vent 116 is determined. To achieve this, the sensors 428 communicate the position of the member 424 to the ECU 422. If the cabin vent is closed, as intended, the process ends. However, if the cabin vent 116 has failed to close in 806, the process proceeds to 810, where a warning is displayed to the user of the BEV 100 to indicate that the cabin vent 116 is open and failed to close. The displayed warning of 810 may take various forms as discussed previously. After the warning is displayed, the process ends.

After it is determined that the BEV 100 is in park/camp mode in 802, the process proceeds with 812. In step 812, the operational state of the battery 104 is determined. In this example, the operational state of the battery 104 is determined by the ECU 122 acting as a battery management system or receiving signals or data from one. In particular, the ECU 122 determines whether a battery failure event has occurred. If a battery failure event has occurred, the process proceeds to 814. If a battery failure event has not occurred, the process proceeds to 822.

In 814, the cabin vent 116 is closed in a similar manner as described for 806 and then proceeds to 816.

In 816, the closure of the cabin vent 116 is determined in a similar manner as described for 808. If the cabin vent 116 is closed, as intended, the process proceeds to 818, a warning is displayed to the user of the BEV 100 to let them know that a battery failure event has been detected and the cabin vent 116 has closed to insulate and protect the cabin 110. The displayed warning of 818 may take various forms as discussed previously. If the cabin vent 116 is open, a emergency warning is displayed to the user in 820. The emergency warning of 820 should be distinct and recognizable from the warnings of 810 and 818, as a battery failure event has occurred and the cabin vent 116 failed to shut as intended. After either of 818 and 820, the process ends.

After it is determined in 812 that no battery failure event is detected, the process proceeds to 822. In 822, the closure of the cabin vent 116 is determined in a manner similar to that discussed for 804. In 822, if the cabin vent 116 is open, as intended, then the process ends, and if the cabin vent 116 is closed, the process proceeds to 824.

In 824, the cabin vent is opened. To achieve this, the ECU 122 sends a signal to the actuator 422 to move the member 424 from its closed position (FIG. 5A) to its open position (FIG. 5B). The process then proceeds to 826.

In 826, the closure of the cabin vent 116 is determined in a similar manner as described for 808 and 816. If the cabin vent 116 is open, as intended, the process ends. However, if the cabin vent 116 failed to open, then the process proceeds to 818, such that a warning message is displayed to the user.

The process 800 may include any of the aforementioned steps in any order and a number of the steps are entirely optional. For example, it is not always necessary or essential to determine if the cabin vent 116 closed or opened as intended (e.g. 808, 816, and 826) and display the relevant warnings (810, 818 and 820).

The present disclosure also includes the below listed items.

Item 1. A method of controlling the ventilation of an electric vehicle comprising a power cell and a cabin vent, wherein the method comprises: determining the operational mode of the electric vehicle; determining the operational state of the power cell; and controlling the closure of the cabin vent based on the operational mode of the electric vehicle and the operational state of the power cell.

Item 2. The method of Item 1, wherein, in response to determining that the operational mode of the vehicle is in drive and/or charge mode, the cabin vent is closed.

Item 3. The method of any preceding Item, wherein, in response to determining that the operational mode of the vehicle is in park and/or camp mode, the cabin vent is opened.

Item 4. The method of any preceding Item, wherein, in response to determining that the operational state of the power cell indicates an error state, the cabin vent is closed.

Item 5. The method of any preceding Item, wherein, in response to determining that the operational state of the power cell indicates that a battery cell is being charged, the cabin vent is closed.

Item 6. The method of any preceding Item, wherein the operational state of the power cell is determined by detecting the presence of fire, heat, or flames proximate the power cell or cabin vent, the cabin vent is closed.

Item 7. The method of Item 6, wherein operational state of the power cell is determined by a heat-deformable latch.

Item 8. The method of any preceding Item, wherein the operational state of the power cell is determined by an electronic control unit and/or a power management system.

Item 9. The method of any preceding Item, wherein the closure of the cabin vent is controlled by a pyrotechnic latch releasing a biased member, that is biased towards occluding the cabin vent, from a position where the biased member does not occlude the cabin vent.

Item 10. The method of any preceding Item, wherein the closure of the cabin vent is controlled by an electronic control unit and/or power management system providing instructions to an actuator to release a biased member, that is biased towards occluding the cabin vent, from a position where the biased member does not occlude the cabin vent.

Item 11. The method of any preceding Item, wherein the closure of the cabin vent is controlled by a switch that is toggleable between at least two different modes, where the switch is configured to send instructions to an actuator to open the vent when the switch is set to camp or park mode and close the vent when the switch is set to drive or charge mode.

Item 12. The method of any preceding Item, wherein the method further comprises checking the closure of the cabin vent after the closure of the cabin vent has been controlled based on the operational mode of the vehicle and the operational state of the power cell.

Item 13. A system of controlling the ventilation of an electric vehicle comprising a power cell and a cabin vent, the system comprising: a member configured to selectively close the cabin vent based on an operational mode of the electric vehicle and an operational state of the power cell.

Item 14. The system of Item 13, wherein the member is biased towards a closed position for occluding the cabin vent in the electric vehicle, the system comprising: a latch arranged to hold the biased member in an open position; and an actuator arranged to move the latch from an engaged position, where the latch holds the biased member in the open position, to a disengaged position, where the latch does not engage the biased member, wherein the actuator is arranged to move the latch the engaged position to the disengaged position, thereby allowing the biased member to move towards the closed position, on receiving a signal from a power management system and/or an electronic control unit indicating the operational mode of the vehicle and the operational state of the battery.

Item 15. The system of Item 14, wherein the latch is heat deformable.

Item 16. The system of Item 13, wherein the member is arranged to be moved between an open position and a closed position for occluding the cabin vent in the electric vehicle, the system comprising: an actuator arranged to move the member between its open position and its closed position; and a switch arranged to provide instructions to the actuator to move the member between the its open and closed position based on the operational mode of the vehicle and the operational state of the battery.

Item 17. An electric vehicle comprising the system of any of Items 13-16.

Item 18. A non-transitory computer-readable medium having non-transitory computer-readable instructions encoded thereon for performing the method of any of Items 1-12.

This disclosure is made for the purpose of illustrating the general principles of the systems and processes discussed above and are intended to be illustrative rather than limiting. More generally, the above description is meant to be exemplary and not limiting and the scope of the disclosure is best determined by reference to the appended claims. In other words, only the claims that follow are meant to set bounds as to what the present disclosure includes.

While the present disclosure is described with reference to particular example applications, it will be appreciated that the disclosure is not limited hereto and that particular combinations of the various features described and defined in any aspects can be implemented and/or supplied and/or used independently. It will be apparent to those skilled in the art that various modifications and improvements may be made without departing from the scope and spirit of the present disclosure. Those skilled in the art would appreciate that the actions of the processes discussed herein may be omitted, modified, combined, and/or rearranged, and any additional actions may be performed without departing from the scope of the disclosure.

Any system features as described herein may also be provided as a method feature and vice versa. As used herein, means plus function features may be expressed alternatively in terms of their corresponding structure. It shall be further appreciated that the systems and/or methods described above may be applied to, or used in accordance with, other systems and/or methods.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

What is claimed is:

1. A method of controlling the ventilation of an electric vehicle comprising a power cell and a cabin vent, wherein the method comprises:
    determining, at an ECU, an operational mode of the electric vehicle;
    determining an operational state of the power cell, wherein the operational state of the power cell is determined by a heat-deformable latch detecting a presence of fire, heat, or flames proximate the power cell or the cabin vent; and
    controlling a member to selectively close the cabin vent based on the operational mode of the electric vehicle and the operational state of the power cell.

2. The method of claim 1, wherein, in response to determining that the operational mode of the vehicle is in drive and/or charge mode, the cabin vent is closed.

3. The method of claim 1, wherein, in response to determining that the operational mode of the vehicle is in park and/or camp mode, the cabin vent is opened.

4. The method of claim 1, wherein, in response to determining that the operational state of the power cell indicates an error state, the cabin vent is closed.

5. The method of claim 1, wherein, in response to determining that the operational state of the power cell indicates that a battery cell is being charged, the cabin vent is closed.

6. The method of claim 1, wherein the operational state of the power cell is determined by an electronic control unit and/or a power management system.

7. The method of claim 1, wherein the heat-deformable latch comprises a pyrotechnic latch releasing a biased member, that is biased towards occluding the cabin vent, from a position where the biased member does not occlude the cabin vent.

8. The method of claim 1, wherein the closure of the cabin vent is controlled by an electronic control unit and/or power management system providing instructions to an actuator to release a biased member, that is biased towards occluding the cabin vent, from a position where the biased member does not occlude the cabin vent.

9. The method of claim 1, wherein the method further comprises checking the closure of the cabin vent after the closure of the cabin vent has been controlled based on the operational mode of the vehicle and the operational state of the power cell.

10. A system of controlling the ventilation of an electric vehicle comprising a power cell and a cabin vent, the system comprising:
    a member configured to selectively close the cabin vent based on an operational mode of the electric vehicle and an operational state of the power cell, wherein the operational state of the power cell is determined by a heat-deformable latch detecting a presence of fire, heat, or flames proximate the power cell or the cabin vent, the cabin vent is closed.

11. The system of claim 10, wherein the member is biased towards a closed position for occluding the cabin vent in the electric vehicle, the system comprising:
    an actuator arranged to move the latch from an engaged position, where the latch holds a biased member in an open position, to a disengaged position, where the latch does not engage the biased member, wherein the actuator is arranged to move the latch from the engaged position to the disengaged position, thereby allowing the biased member to move towards a closed position, on receiving a signal from a power management system and/or an electronic control unit indicating the operational mode of the vehicle and the operational state of the power cell.

12. The system of claim 10, wherein the member is arranged to be moved between an open position and a closed position for occluding the cabin vent in the electric vehicle, the system comprising:

an actuator arranged to move the member between its open position and its closed position; and a switch arranged to provide instructions to the actuator to move the member between its open and closed position based on the operational mode of the vehicle and the operational state of the power cell.

13. An electric vehicle comprising the system of claim 10.

14. A non-transitory computer-readable medium having non-transitory computer-readable instructions encoded thereon for performing the method of claim 1.

15. A method of controlling the ventilation of an electric vehicle comprising a power cell and a cabin vent, wherein the method comprises:

determining, at an ECU, an operational mode of the electric vehicle;

determining, at the ECU, an operational state of the power cell; and controlling, a closure of the cabin vent based on the operational mode of the electric vehicle and the operational state of the power cell, wherein the closure of the cabin vent is controlled by a switch that is toggleable between at least two different modes, where the switch is configured to send instructions to an actuator to open the cabin vent when the switch is set to camp or park mode and close the cabin vent when the switch is set to drive or charge mode.

\* \* \* \* \*